(12) United States Patent
Ezawa et al.

(10) Patent No.: US 8,355,142 B2
(45) Date of Patent: Jan. 15, 2013

(54) MOUNTING POSITION MEASURING DEVICE

(75) Inventors: Kazuaki Ezawa, Tokyo (JP); Kazumasa Fujiwara, Tamano (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 393 days.

(21) Appl. No.: 12/809,266

(22) PCT Filed: Dec. 4, 2008

(86) PCT No.: PCT/JP2008/072085
§ 371 (c)(1),
(2), (4) Date: Jun. 18, 2010

(87) PCT Pub. No.: WO2009/081711
PCT Pub. Date: Jul. 2, 2009

(65) Prior Publication Data
US 2011/0235202 A1 Sep. 29, 2011

(30) Foreign Application Priority Data
Dec. 21, 2007 (JP) .................................. 2007-330749

(51) Int. Cl.
*G01B 11/14* (2006.01)
*G01B 11/00* (2006.01)
*G01B 9/00* (2006.01)

(52) U.S. Cl. .......................... 356/614; 356/124; 356/399
(58) Field of Classification Search ........... 356/600–640
See application file for complete search history.

(56) References Cited

U.S. PATENT DOCUMENTS

| | | | | |
|---|---|---|---|---|
| 4,283,887 A | * | 8/1981 | Horton et al. | 52/2.17 |
| 4,509,501 A | * | 4/1985 | Hunter | 126/602 |
| 4,919,527 A | * | 4/1990 | Saiylov et al. | 359/853 |
| 5,982,481 A | * | 11/1999 | Stone et al. | 356/152.2 |
| 7,612,284 B2 | * | 11/2009 | Rogers et al. | 136/246 |

FOREIGN PATENT DOCUMENTS

| | | |
|---|---|---|
| JP | 59184061 U | 12/1984 |
| JP | 2002154179 A | 5/2002 |

\* cited by examiner

*Primary Examiner* — Gregory J Toatley
*Assistant Examiner* — Jarreas C Underwood
(74) *Attorney, Agent, or Firm* — Jacobson Holman PLLC (57) ABSTRACT

For work in which reflecting mirrors (or facets (31)) to be mounted on a heliostat 3 coincide with a pseudo toroid (53), an adjustment method of, and a mounting posture measuring device for, accurately measuring mounting postures of the respective facets (31) are provided for performing mounting adjustment efficiently and simply. In a method of installing the reflecting mirrors (or the facets (31)) constituting the heliostat 3 for sunlight condensation, each facet (31) is installed in such so that a reflected laser beam (52) reflected by the facet 31 can reach a virtual passage point (52*b*) in a laser point measuring unit (12).

15 Claims, 5 Drawing Sheets

MOUNTING POSITION MEASURING DEVICE

CROSS-REFERENCE TO RELATED APPLICATIONS

The present patent application is a nationalization of International Application No. PCT/JP2008/072085, filed Dec. 4, 2008, published in Japanese, which is based on, and claims priority from, Japanese Application No. JP 2007-330749, filed Dec. 21, 2007, both of which are incorporated herein by reference in their entireties.

TECHNICAL FIELD

The present invention relates to a device for measuring mounting postures of the respective reflecting mirrors (facets) which constitute heliostats for condensing rays of sunlight.

BACKGROUND ART

In the field of solar thermal power generation and the like in which rays of sunlight are condensed and used as energy, a condensation rate of a heliostat 3 (a reflecting mirror) for condensing rays of sunlight is raised by use of a mirror having a concave surface. It is desirable that this concave surface should be formed in three-dimensions with a toroid included therein. A durable mirror having a concave surface has been proposed (see Patent Document 1, for instance).

However, its manufacturing costs are high. In addition, it is difficult to secure the manufacturing accuracy, and to manufacture the mirror in a large size. For this reason, used is a heliostat including small-sized and flat reflecting mirrors (facets 31) made coincide with a toroid 53 in a pseudo manner as shown in FIG. 5.

Figure 5A:
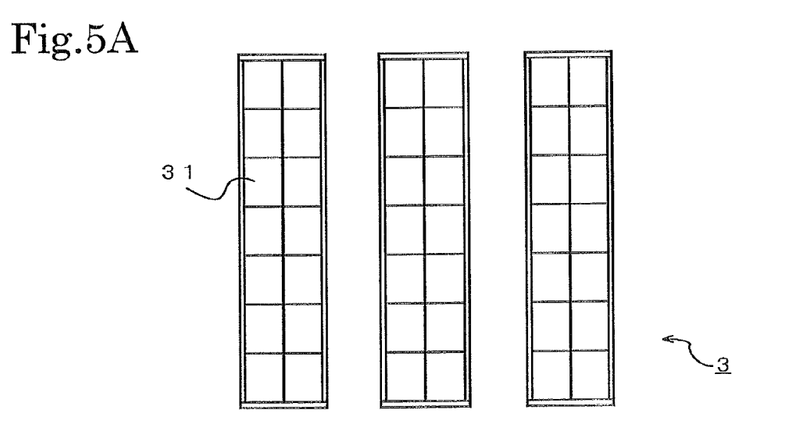
FIG. 5A is a plan view of facets included in a heliostat.
Figure 5B:
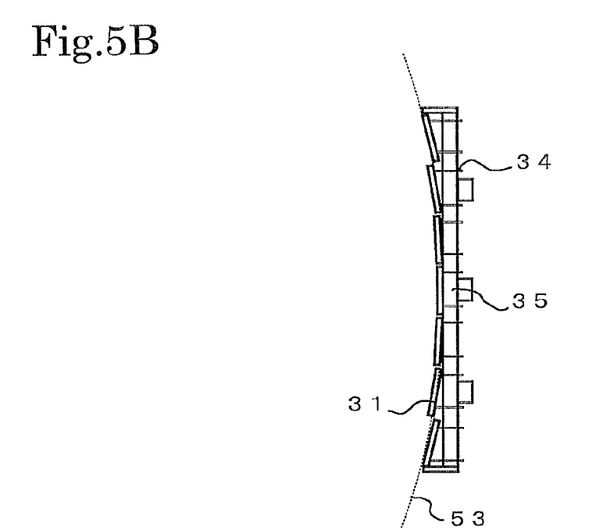
FIG. 5B is a side view of facets included in the heliostat.
Figure 5C:
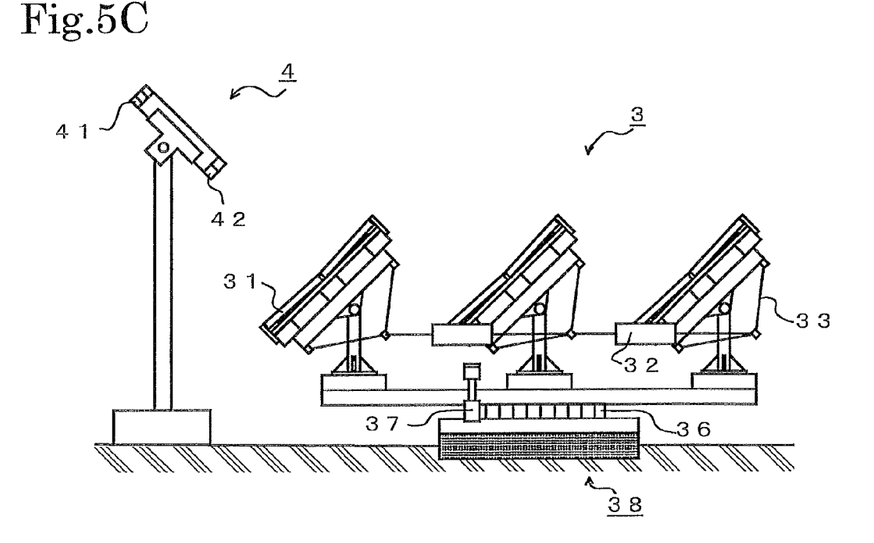
FIG. 5C is a schematic side view of the heliostat.

To put it specifically, as shown in FIG. 5, multiple facets 31 are adjusted and fixed in such a way as to coincide with a form representing the toroid 53, for instance, a form representing a spherical surface. In this case, the adjustment needs to be repeated frequently, because the accuracy of the mounting positions of the respective facets 31 is low.

Patent Document 1: Japanese patent application Kokai publication No. 2002-154179

DISCLOSURE OF THE INVENTION

Problems to be Solved by the Invention

As shown in FIG. 5, the facets 31 are fixed to a facet frame 35 by use of facet bolts 34 in such a way as to coincide with the pseudo toroid 53. A conventionally-performed practice is that: a large-sized pattern paper representing the toroid 53 is made; and while two workers are holding this pattern paper, another worker adjusts the mounting positions of the respective facets. For this reason, something such as the displacement of the pattern paper during the work occurs. This causes a problem that the workability of the conventionally-performed practice is low.

Furthermore, the pseudo toroid 53 is formed by assembling together the facets 31 whose surfaces are flat. To this end, each facet 31 needs to be fixed thereto in such a way that the center of the flat surface of the facet 31 is in contact with the pattern paper, and at an angle which causes the facet to coincide with a line tangent to the toroid. This makes the work accuracy of this work extremely low. Moreover, even if the facets 31 seem to be adjusted in such a way as to coincide with the pattern paper, no rays of light reflected off the facets 31 are often focused on any particular point after rays of sunlight as parallel rays actually falls incident on the facets 31. Thus, the adjustment work of the facets 31 is an extremely difficult work.

Moreover, in reality, also after the facets 31 are mounted in the heliostat 3, the light condensation rate of the heliostat 3 decreases due to the mechanical accuracy of the heliostat 3, and the mounting postures of the respective facets 31 are adjusted repeatedly. Although the installation of the facets 31 requires enormously painstaking work and efforts, it is difficult to achieve a high accuracy.

In this respect, the mounting postures of the respective facets 31 largely affect the rate at which rays of sunlight are condensed in the solar thermal power generation. For this reason, enhancement of accuracy in the mounting postures of the respective facets 31 is essential to improve the efficiency of the solar thermal power generation.

With the above-described circumstances taken into consideration, an object of the present invention is to provide an adjustment method of, and a mounting posture measuring device for, accurately measuring the mounting postures of the respective reflecting mirrors (facets 31) to be mounted on the heliostats 3, so as to perform their mounting adjustment efficiently and easily, in a work of making the mirrors (facets) coincide with the pseudo toroid. In addition, when a group of multiple heliostats 3 in each of which the mounting postures of the facets 31 have been adjusted is fixed together by use of a connector in such a way as to link together, the present invention aims at providing an adjustment method of, and a mounting posture measuring device for, making an adjustment in order to meet focal points of the respective heliostats 3 together.

Means for Solving the Problems

For the purpose of solving the above-mentioned problems, an invention as recited in claim 1 provides a reflecting mirror installation method for a sunlight condensing heliostat including a plurality of reflecting mirrors which are installed on a stage so as to be tiltable, the method adjusting mounting angles of the respective reflecting mirrors 31 so that reflected laser beams 52 obtained by irradiating the plurality of reflecting mirrors 31 with a plurality of single-directional and parallel laser beams are condensed into a focal point 51 of a pseudo toroid 53 formed by the plurality of reflecting mirrors 31. The method is characterized in that: intersection points between virtual paths and a laser point measuring unit 12 are defined as virtual passage points 52b, the virtual paths being formed so as to join the respective reflecting mirrors 31 and the focal point 51, the laser point measuring unit 12 being placed so as to intersect the virtual paths near their corresponding laser generators 11, the laser point measuring unit 12 being configured to measure locations irradiated with the respective laser beams, and the reflecting mirrors 31 are adjusted so that the reflected laser beams 52 reflected by the reflecting mirrors 31 reach their virtual passage points 52b, respectively.

An invention as recited in claim 2 provides a connector adjusting method for a heliostat unit configured by connecting a plurality of sunlight condensing heliostats 6 together by use of a connector 33 so that the heliostats 6 operate in linkage with one another, each heliostat including a plurality of reflecting mirrors 31 which are installed on a stage so as to be tiltable, the plurality of reflecting mirrors 31 being adjusted so that rays of light are condensed into a focal point 51 of a pseudo toroid 53. The method is characterized in that intersection points between virtual paths and a laser point measuring unit 12 are defined as virtual passage points 52b, the virtual paths being formed so as to join the respective reflecting mirrors 31 and the focal point, the laser point measuring unit 12 being placed so as to intersect the virtual paths near their corresponding laser generators 11, the laser point measuring unit 12 being configured to measure locations irradiated with the respective laser beams are irradiated, and the connector 33 is adjusted so that reflected laser beams 52 reflected by the reflecting mirrors 31 reach their virtual passage points 52b, respectively.

An invention as recited in claim 3 provides a mounting posture measuring device 1 for measuring amounting posture of a reflecting mirror 31, the device 1 being that for a sunlight condensing heliostat including a plurality of reflecting mirrors 31 which are installed on a stage so as to be tiltable, the device 1 being used when mounting angles of the respective reflecting mirrors 31 are adjusted so that reflected laser beams 52 obtained by irradiating the plurality of reflecting mirrors 31 with laser beams are condensed into a focal point 51 of a pseudo toroid 53 formed by the plurality of reflecting mirrors 31. The mounting posture measuring device 1 is characterized by including: a plurality of laser generators 11 from which laser beams are emitted in parallel with one another and in a single direction; a laser point measuring unit 12 which receives the laser beams from the laser generators 11, and thus detects locations irradiated with the respective laser beams; and a supporting member 13 on which the laser generators 11 and the laser point measuring unit 12 are installed.

An invention as recited in claim 4 provides a mounting posture measuring device 1 for a heliostat unit configured by connecting a plurality of sunlight condensing heliostats 6 together by use of a connector 33 so that the heliostats 6 operate in linkage with one another, each heliostat including a plurality of reflecting mirrors 31 which are installed on a stage so as to be tiltable, the plurality of reflecting mirrors 31 being adjusted so that rays of light are condensed into a focal point 51 of a pseudo toroid 53. The mounting posture measuring device 1 is characterized by including: a plurality of laser generators 11 from which laser beams are emitted in parallel with one another and in a single direction; a laser point measuring unit 12 which receives the laser beams from the laser generators 11, and thus detects locations irradiated with the respective laser beams; and a supporting member 13 on which the laser generators 11 and the laser point measuring unit 12 are installed.

The mounting posture measuring device 1 according to the invention as recited in claim 5 is characterized in that the supporting member 13 includes a movement mechanism 14 for moving along the reflecting mirrors 31.

The mounting posture measuring device 1 according to the invention as recited in claim 6 is characterized in that the laser generators 11 and the laser point measuring unit 12 are installed on a supporting member 13 shaped like an arch.

The mounting posture measuring device 1 according to claim 7 is characterized in that the laser generators 11 use their respective laser beams whose wavelengths are different from one another, and which represent their respective colors different from one another.

An invention as recited in claim 8 provides a reflecting mirror installation method for a sunlight condensing heliostat including a plurality of reflecting mirrors 31 which are installed on a stage so as to be tiltable, and the method of adjusting mounting angles of the respective reflecting mirrors 31 so that reflected laser beams 52 obtained by irradiating the plurality of reflecting mirrors 31 with a plurality of single-directional and parallel laser beams are condensed into a focal point 51 of a pseudo toroid 53 formed by the plurality of reflecting mirrors 31. The method is characterized in that a laser distance measuring unit 15 which measures a distance by use of a laser beam is installed on a reference line 54 set up in front of the reflecting mirrors 31, a distance between the reference line 54 and each of the reflecting mirrors 31 is measured, and thus, each of the reflecting mirrors 31 is adjusted so that this distance becomes equal to a distance between the reference line 54 and the pseudo toroid 53 to be formed by the reflecting mirrors 31.

An invention as recited in claim 9 provides a connector adjusting method for a heliostat unit configured by connecting a plurality of sunlight condensing heliostats 6 together by use of a connector 33 so that the heliostats 6 operate in linkage with one another, each heliostat including a plurality of reflecting mirrors 31 which are installed on a stage so as to be tiltable, the plurality of reflecting mirrors 31 being adjusted so that rays of light are condensed into a focal point 51 of a pseudo toroid 53. The method is characterized in that a laser distance measuring unit 15 which measures a distance by use of a laser beam is installed on a reference line 54 set up in front of the reflecting mirrors 31, a distance between the reference line 54 and each of the reflecting mirrors 31 is measured, and thus, the connector 33 is adjusted so that this distance becomes equal to a distance between the reference line 54 and the pseudo toroid 53 to be formed by the reflecting mirrors 31.

An invention as recited in claim 10 provides a mounting posture measuring device 1 for measuring amounting posture of a reflecting mirror 31, the device being that for a sunlight condensing heliostat including a plurality of reflecting mirrors 31 which are installed on a stage so as to be tiltable, the device 1 being used when mounted angles of the respective reflecting mirrors 31 are adjusted so that reflected laser beams 52 obtained by irradiating the plurality of reflecting mirrors 31 with laser beams are condensed into a focal point 51 of a pseudo toroid 53 formed by the plurality of reflecting mirrors 31. The mounting posture measuring device 1 is characterized by including a laser distance measuring unit 15 which measures a distance by use of a laser beam and in that the laser distance measuring unit 15 is installed on a reference line 54 set up in front of the reflecting mirrors 31.

An invention as recited in claim 11 provides a mounting posture measuring device 1 for a heliostat unit configured by connecting a plurality of sunlight condensing heliostats 6 together by use of a connector 33 so that the heliostats 6 operate in linkage with one another, each heliostat including a plurality of reflecting mirrors 31 which are installed on a stage so as to be tiltable, the plurality of reflecting mirrors 31 being adjusted so that rays of light are condensed into a focal point 51 of a pseudo toroid 53. The mounting posture measuring device 1 is characterized by including a laser distance measuring unit 15 which measures a distance by use of a laser beam and in that the laser distance measuring unit 15 is installed on a reference line 54 set up in front of the reflecting mirrors 31.

The mounting posture measuring device 1 according to the invention as recited in claim 12 is characterized in that the supporting member 13 includes a movement mechanism 14 for moving along the reflecting mirrors.

The mounting posture measuring device 1 according to the invention as recited in claim 13 is characterized in that the laser distance measuring unit 15 is installed on a supporting member 13 shaped like an arch.

Effects of the Invention

Figure 1:
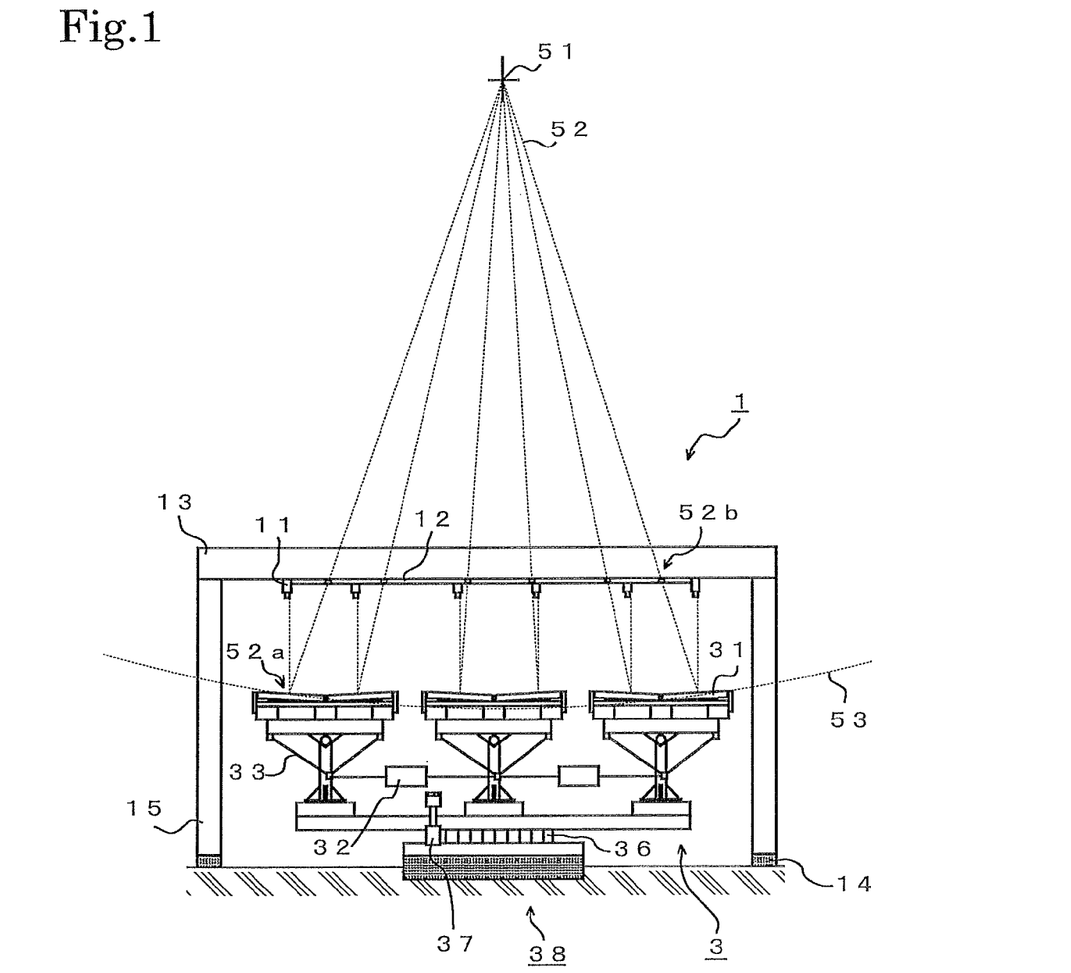
FIG. 1 is a schematic diagram of a mounting posture measuring device according to the present invention.

A device example of the mounting posture measuring device according to the present invention is shown in FIG. 1.

As shown in FIG. 1, in the mounting posture measuring device 1 according to the present invention, an emitted laser beam emitted from each of the laser generators 11 is reflected by a corresponding one of the facets 31. Additionally, the reflected laser beam 52 which is a reflected beam produced by this reflection is received by the laser point measuring unit 12, and the mounting posture of the facet 31 is measured from that position. Hence, the measurement can be made in a limited space such as a factory. Furthermore, because the laser beam which is an actual beam of light is used, the accuracy of the mounting posture of each facet 31 is enhanced compared with that achieved by the conventional method using a pattern.

Moreover, the mounting posture measuring device 1 according to the present invention is configured to be capable of coping with the adjustment of the facets 31 even in a case where the distances of the respective facets 31 to the focal point 51 are different from one another. For instance, the focal lengths of the respective multiple heliostats 3 used for the solar thermal power generation are different from one another depending on where the heliostats 3 are installed. On the other hand, in the mounting posture measuring device 1, a virtual passage point 52b in the laser point measuring unit 12 which a corresponding reflected laser beam 52 is expected to reach is found through calculation based on the position of the focal point 51, and thus the mounting angle of the corresponding facet 31 is adjusted in order for the reflected laser beam 52 to reach this virtual passage point 52b found through the calculation. This makes it possible for the mounting posture measuring device 1 to quickly and accurately measure and adjust the mounting angle of each facet 31 included in each of the heliostats 3 whose focal lengths are different from one another, by changing the corresponding virtual passage point 52b of the reflected laser beam 52.

Figure 2:
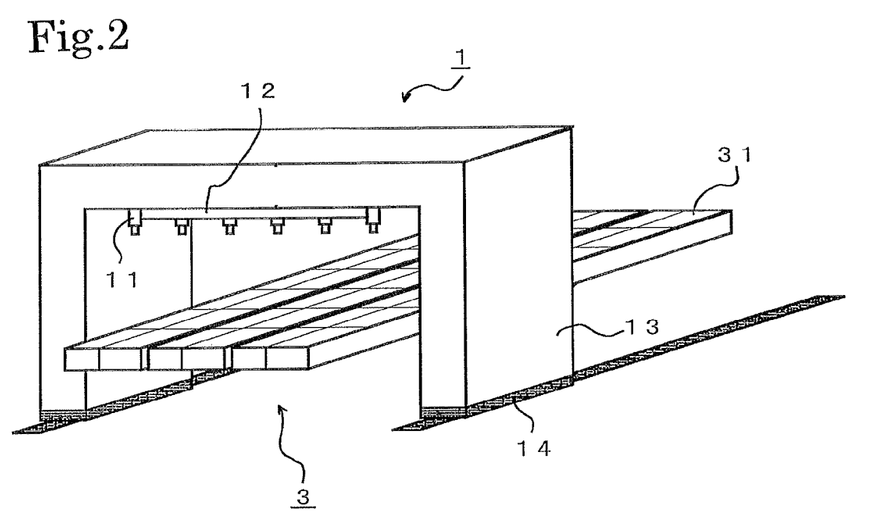
FIG. 2 is an example of how a measurement and a facet adjustment are made by the mounting posture measuring device according to the present invention.

In addition, because the mounting posture measuring device 1 includes the movement mechanism 14, as shown in FIG. 2, the mounting posture measuring device 1 is capable of continuously measuring the mounting angles of the respective facets 31 while moving relative to the facets 31. This enhances the work efficiency of the facet mounting work.

EXPLANATION OF REFERENCE NUMERALS 1 mounting posture measuring device
11 laser generator
12 laser point measuring unit
15 laser distance measuring unit
3 heliostat
31 facet (reflecting mirror)
32 connecting link adjustment mechanism
51 focal point
52 reflected laser beam
52a laser reflection point
52b virtual passage point
53 toroid
54 reference line

BEST MODES FOR CARRYING OUT THE INVENTION

Hereinbelow, concrete descriptions will be provided for an embodiment of the present invention, referring to a mounting posture measuring device shown in the drawings. FIG. 1 shows a configuration of a mounting posture measuring device 1. Laser generators 11 are arranged on a supporting member 13 shaped like an arch in such a way as to stand in a line, and in such a way that laser beams emitted from the respective laser generators 11 are in parallel with one another. A laser point measuring unit 12 is provided at the rear of the laser generators 11. The supporting member 13 includes a movement mechanism 14. In addition, the mounting posture measuring device 1 placed above heliostats 3 which are measurement targets is shown. A position at which rays of sunlight reflected by the heliostats 3 should be condensed is defined as a focal point 51.

The heliostats 3 shown in FIG. 5C are provided with a rotation mechanism 36 for making three facet units capable of rotating while maintaining their horizontal surfaces with multiple facets 31 being fixed to each facet unit. The rotation mechanism 36 is installed on an installation stage 38 fixed in the ground. The heliostats 3 are connected together by a connector 33 in such a way as to operate in linkage with one another. The connector 33 is configured so that the length of the connector 33 can be adjusted by use of connecting link adjustment mechanisms 32. In addition, a sunlight tracking sensor 4 shown in FIG. 5C includes: tracking guides 41; and sunlight sensors 42 for sensing how their corresponding heliostats are tracking the sun. The sunlight tracking sensor 4 is a sensor for controlling the movement of each heliostat 3 in order that the heliostat 3 can establish the most efficient angle with respect to the movement of the sun.

FIG. 5A shows how the multiple facets 31 are mounted on each heliostat 3 while arranged in lines. FIG. 5B shows facets 31 which are viewed from their sides. The multiple facets 31 which are reflecting mirrors are mounted on each facet frame 35 by use of facet mounting bolts 34 in such a way as to be tiltable. The multiple facets 31 are adjusted by use of the facet mounting bolts 34 in such away as to coincide with a pseudo toroid 53 having a focal point 51 into which reflected rays of light are condensed.

FIG. 2 shows how the mounting postures of the respective facets 31 are measured by use of the mounting posture measuring device 1. FIG. 2 is a perspective view of the mounting posture measuring device 1 shown in FIG. 1. In a method of measuring the mounting postures of the respective facets 31, as shown in FIG. 2, the mounting posture measuring device 1 according to the present invention is placed in such a way as to cover the top surface of the heliostat 3; subsequently, laser beams are emitted from the multiple laser generators 11 which are installed in such a way that the laser beams are in parallel with one another; and thus, the laser point measuring unit 12 measures the positions of the respective reflected laser beams 52 reflected by the facets 31.

In the heliostat 3 for condensing rays of sunlight, the angle of each facet 31 is adjusted in such a way that the facet 31 coincides with the pseudo toroid 53 having the focal point 51. In this respect, the reflected laser beams 52 inevitably reaches a single certain point on the laser point measuring unit 12 as long as the facet 31 is placed at its right position.

Figure 3:
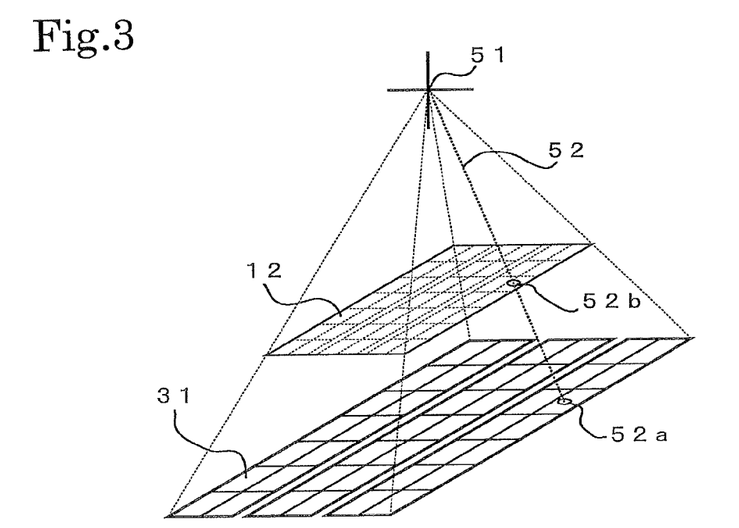
FIG. 3 is a schematic diagram of an optical path of a laser beam reflected by a facet.
Figure 4:
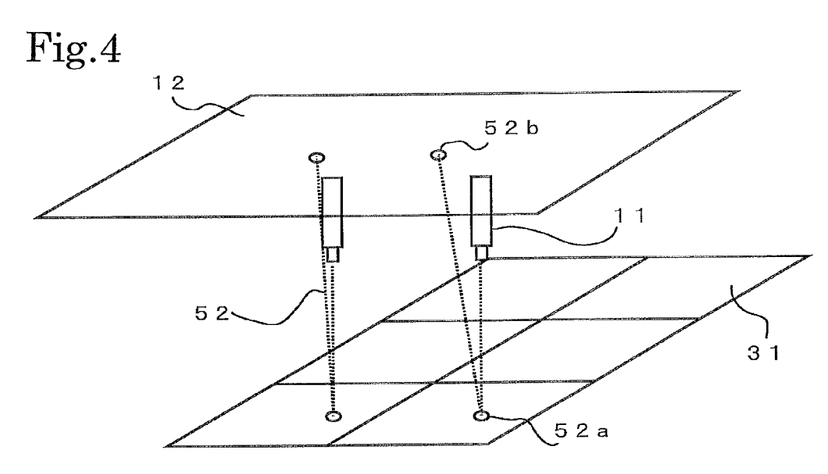
FIG. 4 is a magnified view of optical paths of laser beams reflected by facets, respectively.

To put it specifically, it is learned that a reflected laser beam 52 reflected at a laser reflection point 52a on one of the facets 31 shown in FIGS. 3 and 4 inevitably reaches a virtual passage point 52b on the laser point measuring unit 12 because the reflected laser beam 52 travels to the focal point 51. When the facets 31 are adjusted by use of their facet mounting bolts 34 so that the reflected laser beams 52 can reach the respective virtual passage points 52b which are found in advance, it is possible to adjust the postures of the facets 31 in such a way that the facets 31 can be located at their right positions which cause their reflected parallel rays of light to be condensed into the focal point 51.

In this respect, the postures of the respective facets 31 are measured by use of actual rays of light. For this reason, this measurement is made in the same condition as the measurement made when the facets 31 are used for the solar thermal power generation. This makes it possible to adjust the facets 31 with extremely high accuracy, and thus to guarantee the rate at which the reflected rays of light are condensed into the focal point 51 at a level higher than ever. Accordingly, enhancement of the efficiency of the solar thermal power generation is achieved.

Furthermore, the mounting angle of each facet 31 can be measured and thus adjusted while the mounting posture measuring device 1 is moved by use of the movement mechanism 14. In particular, in a case where the mounting posture of each facet 31 is checked at a time when power generation starts with the heliostats 3 being installed in a solar thermal power generation plant, it is possible to carry out the check work quickly while moving the mounting posture measuring device 1 in the solar thermal power generation plant by use of the movement mechanism 14, and it is concurrently easy to do things such as carry out the check work. This makes it easy to check the mounting posture of each facet 31 more frequently than ever. Accordingly, it is possible to detect, at an early time, decrease in the efficiency of the solar thermal power generation, which occurs due to a decreased condensation rate of each facet 31 resulting from things such as change in the mounting posture of the facet 31 under an effect of the wind. As a consequence, it is possible to keep the efficiency of the solar thermal power generation.

Moreover, because the three heliostats 3 connected together are tilted at their respective angles which enables the heliostats 3 to receive the largest amount of sunlight on the basis of information acquired by the sunlight sensor 42 for measuring the position of the sun, it is possible to condense, at a high efficiency, rays of the sunlight into a positions in which the rays of sunlight are expected to be condensed. The achieved high efficiency of the condensation of the rays of sunlight by use of the sunlight tracking system can be further enhanced by enhancing the accuracy of the mounting posture of each facet 31.

As described above, the mounting posture measuring device 1 according to the present invention makes it possible to accurately measure and thus adjust the mounting angles of the facets 31 mounted on each heliostat 3 for condensing rays of sunlight. For instance, in a case where tens to hundreds of heliostats 3 are adjusted in a large-scaled solar thermal power generation plant or the like, the mounting posture measuring device 1 demonstrates its extremely high workability, enabling the facets 31 to be adjusted quickly regardless of the site such as a factory or installation site.

In addition, making it possible to adjust and thus keep the mounting posture of each facet 31, which largely affects the efficiency of the solar thermal power generation, with high accuracy, the mounting posture measuring device 1 makes it possible to enhance the efficiency of the solar thermal power generation to a large extent.

Embodiment 1

Figure 6:
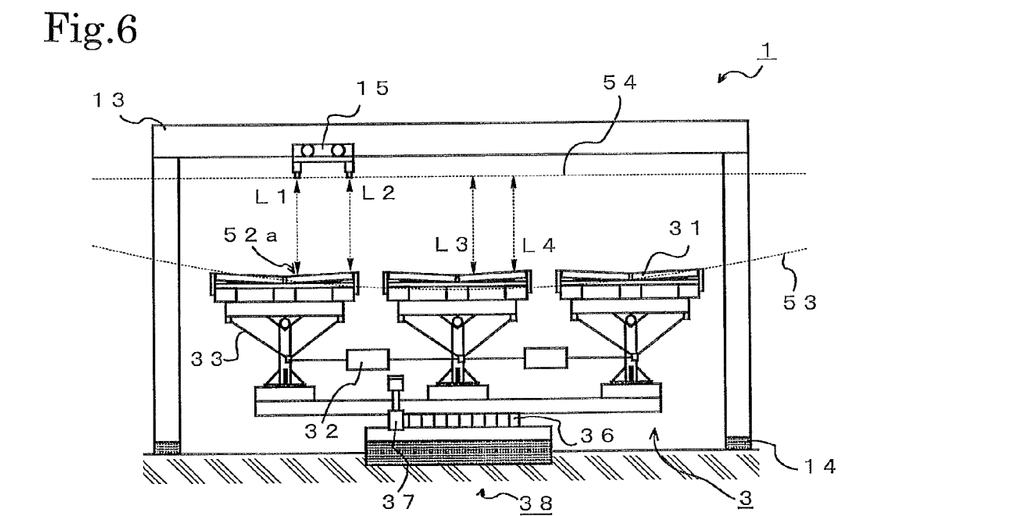
FIG. 6 is a schematic diagram of a facet mounting posture measuring device including a laser distance measuring unit.

FIG. 6 shows a configuration of a different embodiment of the mounting posture measuring device 1. A laser distance measuring unit 15 for measuring distances by use of laser beams is installed on the supporting member 13 shaped like an arch, and in such a way that the laser distance measuring unit 15 moves along a reference line 54 which is arbitrarily determined in such a way as to be in parallel with the supporting member 13. The supporting member 13 includes the movement mechanism 14. Furthermore, FIG. 6 shows how the mounting posture measuring device 1 is placed above the heliostats 3 which are measurement subjects.

In a method of measuring the mounting postures of the respective facets 31, laser beams are emitted from the laser distance measuring unit 15, and distances from the arbitrarily-established reference line 54 to each facet 31 is thus measured.

In this respect, in each heliostat 3 for condensing rays of sunlight, the angle of each facet 31 is adjusted in such a way that the facet 31 coincides with the pseudo toroid 53 having the focal point 51. To this end, the pseudo toroid 53 is determined on the basis of the distance of each heliostat 3 to the focal point which should be adjusted. For this reason, a distance d1 between the toroid 53 and the arbitrarily-determined reference line 54 is determined of its own accord. At this time, a distance L1 between the reference line 54 and the facet 31 is compared with the thus-found distance d1, the distance L1 measured by use of the laser distance measuring unit 15 configured to move on the reference line 54. Hence, the facet 31 is adjusted so that the lengths d1 and L1 can be equal to each other. As described above, the mounting postures of the respective facets 31 are adjusted while the laser distance measuring unit 15 is moved along the reference line 54. For this reason, it is desirable that the reference line 54 should be determined so as to be in parallel with an installation plane on which the corresponding heliostat 3 is installed. For instance, in a case where the reference line 54 extends in a direction in which the distance from any facet 31 is gradually increased, the laser distance measuring unit 15 needs to be moved along such a reference line 54. In this case, the supporting member 13 may result in a one in an extraordinary large size.

Figure 7:
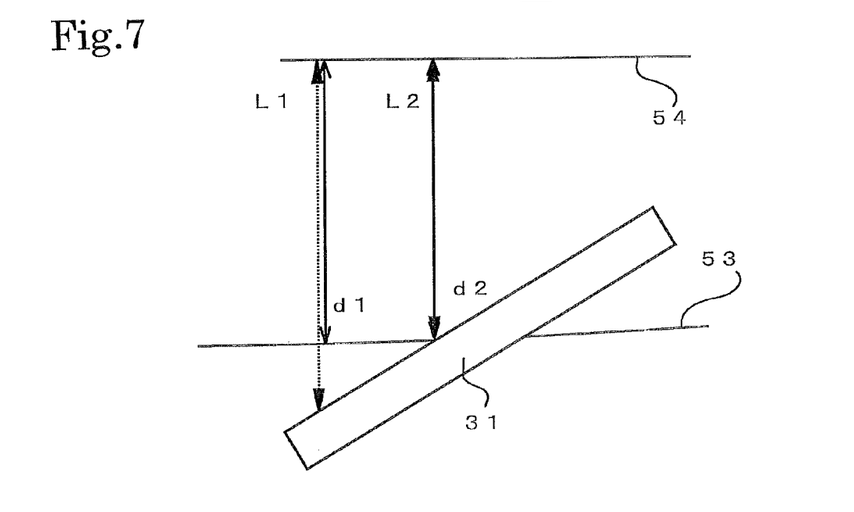
FIG. 7 is an example of how a measurement is made by the facet mounting posture measuring device including the laser distance measuring unit.

FIG. 7 shows a schematic diagram of a facet 31 whose mounting posture is being measured. First of all, the distance L1 between the arbitrarily-determined reference line 54 and the facet 31 is measured by use of the laser distance measuring unit 15. At this time, if the facet 31 is not put in a right posture, the distance d1 between the reference line 54 and the toroid 53 is unequal to L1. If the facet 31 is put in the right posture, the distances are equal to each other as indicated by reference numerals d2 and L2. When the distance between the reference line 54 and the facet 31 are measured at several points as described above, it is possible to grasp the displacement of the posture of the facet 31 relative to the toroid 53. Accordingly, it is possible to adjust the posture of the facet 31 in response to the thus-grasped displacement.

As described above, with the use of the laser distance measuring unit 15, it is possible to obtain the same effect as the mounting posture measuring device 1 for measuring the postures of the facets 31 and the heliostats 3 which includes the laser generators 11 and the laser point measuring unit 12.

What is claimed is:

1. A reflecting mirror installation method for a sunlight condensing heliostat, comprising:
    installing a sunlight condensing heliostat including a plurality of reflecting mirrors on a stage so as to be tiltable;
    adjusting mounting angles of the respective reflecting mirrors so that reflected laser beams obtained by irradiating the plurality of reflecting mirrors with a plurality of single-directional and parallel laser beams are condensed into a focal point of a pseudo toroid formed by the plurality of reflecting mirrors, characterized in that intersection points between virtual paths and a laser point measuring unit are defined as virtual passage points, the virtual paths being formed so as to join the respective reflecting mirrors and the focal point, the laser point measuring unit being placed so as to intersect the virtual paths near their corresponding laser generators;
    configuring the laser point measuring unit to measure locations irradiated with the respective laser beams, and
    adjusting the reflecting mirrors so that the reflected laser beams reflected by the reflecting mirrors reach their virtual passage points, respectively.

2. A connector adjusting method for a heliostat unit comprising:
    connecting a plurality of sunlight condensing heliostats together by use of a connector so that the heliostats operate in linkage with one another, each heliostat including a plurality of reflecting mirrors which are installed on a stage so as to be tiltable;
    adjusting the plurality of reflecting mirrors so that rays of light are condensed into a focal point of a pseudo toroid, characterized in that intersection points between virtual paths and a laser point measuring unit are defined as virtual passage points, the virtual paths being formed so as to join the respective reflecting mirrors and the focal point, the laser point measuring unit being placed so as to intersect the virtual paths near their corresponding laser generators;
    configuring the laser point measuring unit to measure locations irradiated with the respective laser beams are irradiated, and
    adjusting the connector so that reflected laser beams reflected by the reflecting mirrors reach their virtual passage points, respectively.

3. A mounting posture measuring device for measuring a mounting posture of a reflecting mirror, comprising:
    a sunlight condensing heliostat including a plurality of reflecting mirrors installed on a stage so as to be tiltable, the device being used when mounting angles of the respective reflecting mirrors are adjusted so that reflected laser beams obtained by irradiating the plurality of reflecting mirrors with laser beams are condensed into a focal point of a pseudo toroid formed by the plurality of reflecting mirrors;
    a plurality of laser generators from which laser beams are emitted in parallel with one another and in a single direction;
    a laser point measuring unit which receives the laser beams from the laser generators, and detects locations irradiated with the respective laser beams; and
    a supporting member on which the laser generators and the laser point measuring unit are installed.

4. A mounting posture measuring device for a heliostat unit, comprising:
    a plurality of sunlight condensing heliostats connected together by use of a connector so that the heliostats operate in linkage with one another, each heliostat including a plurality of reflecting mirrors which are installed on a stage so as to be tiltable, the plurality of reflecting mirrors being adjusted so that rays of light are condensed into a focal point of a pseudo toroid;
    a plurality of laser generators from which laser beams are emitted in parallel with one another and in a single direction;
    a laser point measuring unit which receives the laser beams from the laser generators, and detects locations irradiated with the respective laser beams; and
    a supporting member on which the laser generators and the laser point measuring unit are installed.

5. The mounting posture measuring device according to claim 3, wherein the supporting member includes a movement mechanism for moving along the reflecting mirrors.

6. The mounting posture measuring device according to claim 5, wherein the laser generators and the laser point measuring unit are installed on a supporting member shaped like an arch.

7. The mounting posture measuring device according to claim 6, wherein the laser generators use their respective laser beams whose wavelengths are different from one another, and which represent their respective colors different from one another.

8. A reflecting mirror installation method for a sunlight condensing heliostat, comprising:
    installing a sunlight condensing heliostat including a plurality of reflecting mirrors on a stage so as to be tiltable;
    adjusting mounting angles of the respective reflecting mirrors so that reflected laser beams obtained by irradiating the plurality of reflecting mirrors with a plurality of single-directional and parallel laser beams are condensed into a focal point of a pseudo toroid formed by the plurality of reflecting mirrors, characterized in that a laser distance measuring unit which measures a distance by use of a laser beam is installed on a reference line set up in front of the reflecting mirrors,
    measuring a distance between the reference line and each of the reflecting mirrors, and
    adjusting each of the reflecting mirrors so that this distance becomes equal to a distance between the reference line and the pseudo toroid to be formed by the reflecting mirrors.

9. A connector adjusting method for a heliostat unit, comprising:
    connecting a plurality of sunlight condensing heliostats together by use of a connector so that the heliostats operate in linkage with one another, each heliostat including a plurality of reflecting mirrors which are installed on a stage so as to be tiltable;
    adjusting the plurality of reflecting mirrors so that rays of light are condensed into a focal point of a pseudo toroid, characterized in that a laser distance measuring unit which measures a distance by use of a laser beam is installed on a reference line set up in front of the reflecting mirrors,
    measuring a distance between the reference line and each of the reflecting mirrors, and
    adjusting the connector so that this distance becomes equal to a distance between the reference line and the pseudo toroid to be formed by the reflecting mirrors.

10. A mounting posture measuring device for measuring a mounting posture of a reflecting mirror, comprising:
- a sunlight condensing heliostat including a plurality of reflecting mirrors installed on a stage so as to be tiltable, the device being used when mounted angles of the respective reflecting mirrors are adjusted so that reflected laser beams obtained by irradiating the plurality of reflecting mirrors with laser beams are condensed into a focal point of a pseudo toroid formed by the plurality of reflecting mirrors;
- a laser distance measuring unit which measures a distance by use of a laser beam, the laser distance measuring unit being installed on a reference line set up in front of the reflecting mirrors.

11. A mounting posture measuring device for a heliostat unit, comprising:
- a plurality of sunlight condensing heliostats connected together by use of a connector so that the heliostats operate in linkage with one another, each heliostat including a plurality of reflecting mirrors which are installed on a stage so as to be tiltable, the plurality of reflecting mirrors being adjusted so that rays of light are condensed into a focal point of a pseudo toroid;
- a laser distance measuring unit which measures a distance by use of a laser beam, the laser distance measuring unit being installed on a reference line set up in front of the reflecting mirrors.

12. The mounting posture measuring device according to claim 10, wherein the supporting member includes a movement mechanism for moving along the reflecting mirrors.

13. The mounting posture measuring device according to claim 12, wherein the laser distance measuring unit is installed on a supporting member shaped like an arch.

14. The mounting posture measuring device according to claim 4, wherein the supporting member includes a movement mechanism for moving along the reflecting mirrors.

15. The mounting posture measuring device according to claim 11, wherein the supporting member includes a movement mechanism for moving along the reflecting mirrors.

* * * * *